United States Patent
Slabbert et al.

(10) Patent No.: US 11,577,162 B2
(45) Date of Patent: Feb. 14, 2023

(54) PLAYER JOURNEY

(71) Applicant: Digital Gaming Corporation Limited, London (GB)

(72) Inventors: Andrew Thomas Slabbert, Durban (ZA); Terence Marc Stievenart, Durban (ZA); Fredrik Nilsson, Nödinge (SE)

(73) Assignee: Games Global Operations Limited, Douglas (IM)

( * ) Notice: Subject to any disclaimer, the term of this patent is extended or adjusted under 35 U.S.C. 154(b) by 0 days.

(21) Appl. No.: 16/865,511

(22) Filed: May 4, 2020

(65) Prior Publication Data

US 2020/0360804 A1    Nov. 19, 2020

Related U.S. Application Data

(63) Continuation of application No. 15/682,823, filed on Aug. 22, 2017, now Pat. No. 10,646,775.

(60) Provisional application No. 62/399,789, filed on Sep. 26, 2016.

(51) Int. Cl.
  *G07F 17/32* (2006.01)
  *A63F 13/30* (2014.01)
  *A63F 13/55* (2014.01)

(52) U.S. Cl.
  CPC .............. *A63F 13/30* (2014.09); *A63F 13/55* (2014.09); *G07F 17/326* (2013.01); *G07F 17/3223* (2013.01); *G07F 17/3227* (2013.01); *G07F 17/3239* (2013.01)

(58) Field of Classification Search
  CPC . G07F 17/326; G07F 17/3239; G07F 17/3227
  See application file for complete search history.

(56) References Cited

U.S. PATENT DOCUMENTS

| | | |
|---|---|---|
| 2004/0266516 A1 | 12/2004 | Thomas |
| 2009/0239604 A1* | 9/2009 | Acres ...................... G07F 17/32 463/16 |
| 2010/0048302 A1 | 2/2010 | Lutnick et al. |
| 2010/0120492 A1 | 5/2010 | Davis et al. |
| 2011/0223991 A1 | 9/2011 | Powell et al. |
| 2013/0079101 A1 | 3/2013 | Nicely |
| 2013/0130781 A1* | 5/2013 | Anderson ........... G07F 17/3244 463/25 |
| 2014/0018155 A1 | 1/2014 | Nelson et al. |

(Continued)

*Primary Examiner* — James S. McClellan
(74) *Attorney, Agent, or Firm* — McDonnell Boehnen Hulbert & Berghoff LLP

(57) ABSTRACT

Disclosed herein are methods and apparatus related to enhancing player experiences at gaming locations via player journey actions. A server computing device can receive one or more gaming location events related to one or more electronic gaming machines. Each of the electronic gaming machine(s) can be configured to play one or more wager games. At least one of the gaming location events can be associated with a particular wager game. The server computing device can determine one or more player journey actions based on the gaming location events, where the one or more player journey actions instruct at least one electronic gaming machine to perform one or more actions related to the gaming location events. The server computing device can send the gaming location events.

20 Claims, 4 Drawing Sheets

(56) References Cited

U.S. PATENT DOCUMENTS

2015/0112783 A1* 4/2015 Nikolaev ........... G06Q 30/0217
                                                    705/14.19
2016/0078714 A1   3/2016 Gilmore et al.
2016/0358412 A1* 12/2016 Eaton .................. G07F 17/3223
2018/0085666 A1   3/2018 Slabbert et al.

* cited by examiner

410 Send, from an electronic gaming machine, one or more gaming location events, where the electronic gaming machine is configured to play one or more wager games, and where at least one gaming location event of the one or more gaming location events is associated with a particular wager game of the one or more wager games

420 After sending the one or more gaming location events, receiving one or more player journey actions at the electronic gaming machine, where the one or more player journey actions instruct the electronic gaming machine to perform one or more actions that relate to the one or more gaming location events

430 Perform the one or more actions using the electronic gaming machine

FIG. 4

PLAYER JOURNEY

CROSS-REFERENCE TO RELATED APPLICATIONS

This disclosure is a continuation of, and claims priority to, U.S. patent application Ser. No. 15/682,823 filed on Aug. 22, 2017, which claims priority to U.S. Provisional Pat. App. No. 62/399,789 filed on Sep. 26, 2016, each of which is hereby incorporated herein by reference in its entirety.

BACKGROUND

This disclosure relates to gaming machines for playing games such as wager games.

Wager games can be played on a variety of electromechanical and electronic devices. An electro-mechanical slot machine may include one or more reels, each of which includes multiple symbols distributed around the circumference of the reel. When a player places a wager (e.g., by placing a coin in the machine), the player is allowed to spin the reels. Each reel then comes to rest, typically with either one of the symbols, or a space in between symbols, in alignment with a pay line. A predefined winning symbol or a predefined winning combination of symbols that are aligned with the pay line can result in the player winning the game and receiving a payout. In one example, the machine may include three reels, and the pay line may be a horizontal line disposed across a center of each of the three reels.

In another example of a wager game, an electro-mechanical slot machine may present symbols in a matrix arrangement, with each symbol changing during a spin of the game. For example, the machine may have five columns and three rows of symbols, for a total of fifteen symbols. Such machines often have multiple pay lines, each being defined by a collection of positions within the matrix. For example, the machine may have three pay lines, each corresponding to one row of the matrix.

Other gaming machines are possible as well. An electronic gaming machine can be located in a gaming location, such as a casino. The electronic gaming machine can include a graphical user interface (GUI) that emulates an electro-mechanical slot machine. With an electronic gaming machine, the GUI may include a display that displays an image of one or more reels or a matrix as described above, together with animation effects to simulate a spin of the one or more reels, or a spin of the columns or rows of the matrix. A computer software program, which may reside in the electronic gaming machine, may randomly select one or more symbols in response to a spin, and may display the selected one or more symbols on the display.

OVERVIEW

Example embodiments are described herein. In a first respect, an example embodiment takes the form of a method, comprising: receiving, at a server computing device, one or more gaming location events, where the one or more gaming location events are related to one or more electronic gaming machines, where each of the one or more electronic gaming machines is configured to play one or more wager games, and where at least one gaming location event of the one or more gaming location events is associated with a particular wager game of the one or more wager games; determining one or more player journey actions based on the one or more gaming location events using the server computing device, where the one or more player journey actions instruct at least one of the one or more electronic gaming machines to perform one or more actions related to the one or more gaming location events; and sending the one or more player journey actions using the server computing device.

In a second respect, an example embodiment takes the form of a server computing device, comprising: a processor; and a data storage device configured to store at least computer-readable program instructions that, when executed by the processor, cause the server computing device to perform functions. The functions include: receiving one or more gaming location events, where the one or more gaming location events are related to one or more electronic gaming machines, where each of the one or more electronic gaming machines is configured to play one or more wager games, and where at least one gaming location event of the one or more gaming location events is associated with a particular wager game of the one or more wager games; determining one or more player journey actions based on the one or more gaming location events, where the one or more player journey actions instruct at least one of the one or more electronic gaming machines to perform one or more actions related to the one or more gaming location events; and sending the one or more player journey actions.

In a third respect, an example embodiment takes the form of a computer-readable medium configured to store instructions that, when executed by a processor of a server computing device, cause the server computing device to carry out to perform functions. The functions include: receiving one or more gaming location events, where the one or more gaming location events are related to one or more electronic gaming machines, where each of the one or more electronic gaming machines is configured to play one or more wager games, and where at least one gaming location event of the one or more gaming location events is associated with a particular wager game of the one or more wager games; determining one or more player journey actions based on the one or more gaming location events, where the one or more player journey actions instruct at least one of the one or more electronic gaming machines to perform one or more actions related to the one or more gaming location events; and sending the one or more player journey actions.

In a fourth respect, an example embodiment takes the form of a server computing device, including: means for receiving one or more gaming location events, where the one or more gaming location events are related to one or more electronic gaming machines, where each of the one or more electronic gaming machines is configured to play one or more wager games, and where at least one gaming location event of the one or more gaming location events is associated with a particular wager game of the one or more wager games; means for determining one or more player journey actions based on the one or more gaming location events, where the one or more player journey actions instruct at least one of the one or more electronic gaming machines to perform one or more actions related to the one or more gaming location events; and means for sending the one or more player journey actions.

In a fifth respect, an example embodiment takes the form of a method, comprising: sending, from an electronic gaming machine, one or more gaming location events, where the electronic gaming machine is configured to play one or more wager games, and where at least one gaming location event of the one or more gaming location events is associated with a particular wager game of the one or more wager games; after sending the one or more gaming location events, receiving one or more player journey actions at the electronic gaming machine, where the one or more player journey actions instruct the electronic gaming machine to perform one or more actions that relate to the one or more gaming location events; and performing the one or more actions using the electronic gaming machine.

In a sixth respect, an example embodiment takes the form of an electronic gaming machine, including: a processor; and a data storage device configured to store at least computer-readable program instructions that, when executed by the processor, cause the electronic gaming machine to carry out functions. The functions include: sending one or more gaming location events, where the electronic gaming machine is configured to play one or more wager games, and where at least one gaming location event of the one or more gaming location events is associated with a particular wager game of the one or more wager games; after sending the one or more gaming location events, receiving one or more player journey actions, where the one or more player journey actions instruct the electronic gaming machine to perform one or more actions that relate to the one or more gaming location events; and performing the one or more actions.

In a seventh respect, an example embodiment takes the form of a computer-readable medium configured to store instructions that, when executed by a processor of an electronic gaming machine, cause the electronic gaming machine to carry out functions. The functions include: sending one or more gaming location events, where the electronic gaming machine is configured to play one or more wager games, and where at least one gaming location event of the one or more gaming location events is associated with a particular wager game of the one or more wager games; after sending the one or more gaming location events, receiving one or more player journey actions, where the one or more player journey actions instruct the electronic gaming machine to perform one or more actions that relate to the one or more gaming location events; and performing the one or more actions.

In an eighth respect, an example embodiment takes the form of an electronic gaming machine, including: means for sending one or more gaming location events, where the electronic gaming machine is configured to play one or more wager games, and where at least one gaming location event of the one or more gaming location events is associated with a particular wager game of the one or more wager games; means for, after sending the one or more gaming location events, receiving one or more player journey actions, where the one or more player journey actions instruct the electronic gaming machine to perform one or more actions that relate to the one or more gaming location events; and means for performing the one or more actions.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the disclosure.

BRIEF DESCRIPTION OF THE DRAWINGS

FIG. 4 is a flow chart of functions to carry out a method, in accordance with an example embodiment.

DETAILED DESCRIPTION

I. Introduction

Figure 1:
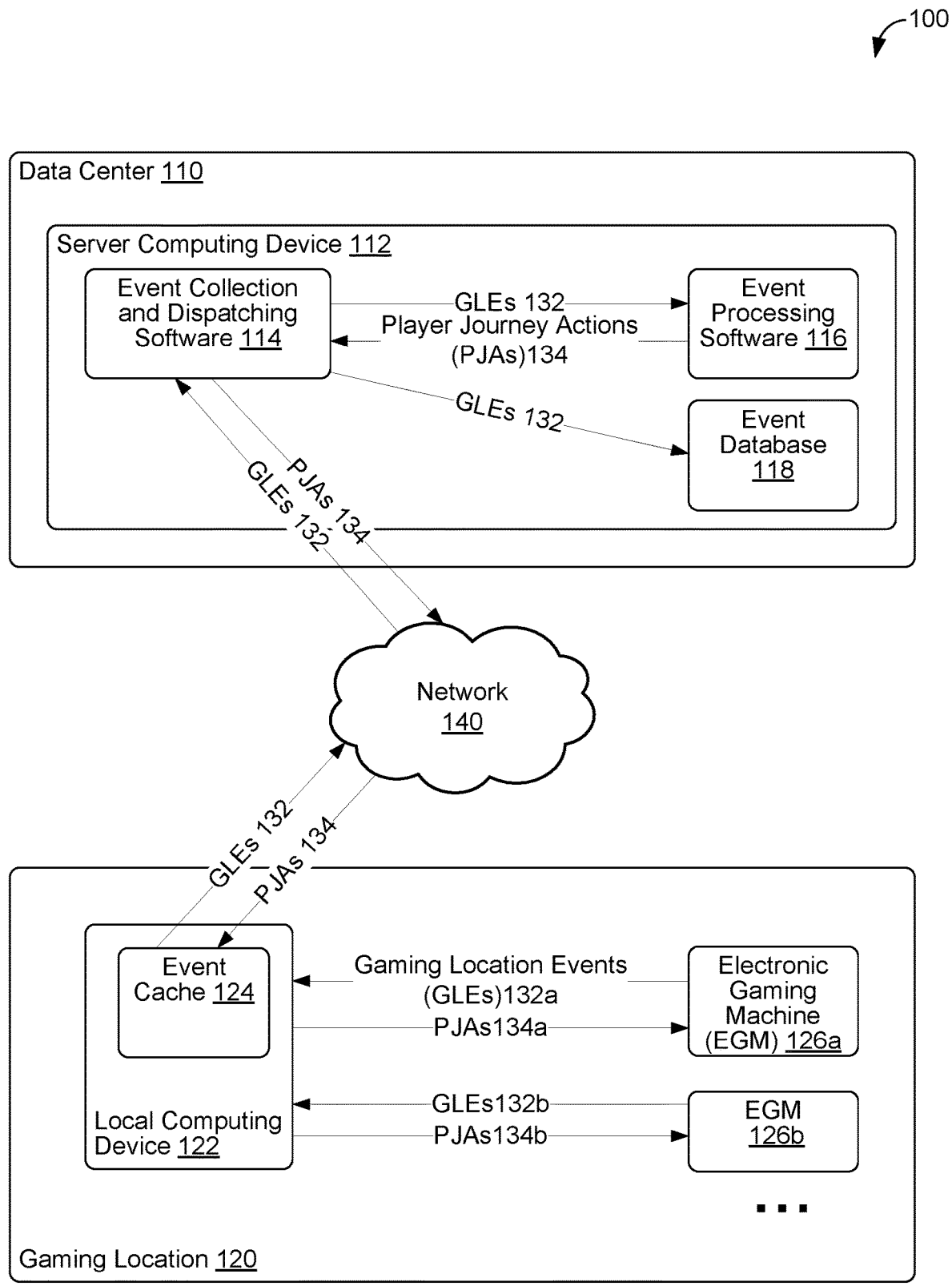
FIG. 1 is a schematic representation of a system involving a data center and a gaming location in accordance with an example embodiment.

This application relates to player journey actions (PJAs) that enhance game player experience while using electronic game machines (EGMs) that are connected to a server, where the server can be part of a gaming platform. The server and an electronic game machine can communicate in real-time to enhance the experience of an electronic game machine player. The electronic game machine can send the server real-time information, such as gaming location events (GLEs), that can relate to a game that the player is playing on the electronic game machine. The gaming location events can include the player's wagers, wins/losses, reel positions and their respective symbols, gaming options selected by the player, and other player behaviors and game events. The server analyses the gaming location events and, when certain trigger conditions are met, sends player journey actions in real time to the electronic game machine. Example trigger conditions can include a low balance threshold, the player experiencing a winning streak, and the player experiencing a losing streak. The player journey actions can be treated as instructions by an electronic game machine. The instructions provided by the player journey actions can cause the electronic game machine to display informational notifications, show promotional materials, provide incentives, bonuses, rewards, and other items of value that can be used by the player, and perform other actions.

The player journey actions can be tied to the trigger conditions so as to encourage desired player behavior. As one example, a low balance threshold could result in an incentive to add more credits. A player's losing streak could result in a message to provide encouragement to the player, such as: "This may not be your lucky day. Maybe a free spin will change your luck."

Player journey actions can be tied to a player-created tracking account managed by the server and/or the gaming platform. The tracking account can track the player's experience across different games and different electronic game machines as well as different venues. The gaming platform can provide casino managers a tool box of powerful acquisition, retention and marketing tools that utilize the tracking accounts so that their players have an enjoyable gaming experience. Also, the gaming platform and tracking accounts can maximize casino revenue by unlocking the full potential of existing player worth, attracting new players into the casino, and retain existing players, and/or for other reasons.

Example embodiments can provide real-time player behavior analytics and gamification. The real-time player behavior analytics can involve monitoring and managing specific game events and outcomes in real time and can beneficially ensure that players have the premium experience they expect. Such analytics can also help businesses understand player behavior patterns and assist in future enhancements to the player experience. Gamification is defined as the application of game-like characteristics to everyday activities to make them more interesting. Gamification can improve player engagement, increase game enjoyment, and increase loyalty. Gamification can further play a key role in marketing and player retention.

The server can include an event processing engine (EPE) that computes and evaluates algorithms (e.g., casino-specific algorithms) related to gaming location events (GLEs) to produce player journey actions based on real-time analytics. In some embodiments, gaming location events can include events related to one or more specific electronic game machines, games, players, dates/times, and/or locations. The EPE can generate player journey actions as responses to these events. In some embodiments, the generated player journey actions can be, but are not limited to: instructions providing bonuses, free games, and/or cash to players; instructions to provided custom messaging directed to a specific player, electronic game machine, or gaming location; instructions to display imagery and/or play audio related to a "top screen", "custom lobby", and/or promotional materials for a specific player, electronic game machine, or gaming location; and instructions related to recommendations and/or achievements related to a specific game, player, electronic game machine, and/or gaming location.

In an example embodiment, the EPE incorporates the Nesper query language or any alternative query language for temporal event processing. The event processing can involve filtering events by conditions, joining event streams, and detecting and responding to various event patterns and sequences across streams. The EPE platform can be configured to accept events from multiple systems and applications, referred to as "producers." A producer can be an EGM, a gaming server, or an external third party system that generates and relays events. An event stream can be a sequence of data packets that have been generated by a producer. Each data packet may contain specific information relating to the producer and the corresponding event. Examples of event streams include without limitation: player registration; player login; player logout; player cash in; player wager; in-game achievement; and player cash out (player ticket out).

A message broker (notification services) can accept messages from producers and offer the messages to consumers in a reliable manner. In the case of the EPE platform, the producers can be any system that is capable of creating a message in the notification services message channel. The consumer that messages would be brokered to for the EPE platform is the event collector. The event collector can enrich messages from the notification services and can decide which event stream the event should be written to using specific ID matching.

Standing queries, which could be either simple or complex algorithms, exist on the EPE platform for detecting event patterns that trigger player journey actions. The standing queries can filter events by conditions, join multiple event streams, and detect and respond to various event patterns and sequences across streams. A standing query can be a simple query, such as notify a consumer (e.g., an EGM) when the player has wagered and lost a certain number of times in a row. A standing query could also be more complex and can involve pattern matching, so that the consumer can be notified of an event that crosses multiple streams. For example, a standing query could notify the consumer (e.g., an EGM) when a player has inserted a certain amount of credits and has lost X % of the original credit amount in a time range of Y minutes.

Examples of standing queries are the following:
Player Big Win: A player has a win amount greater than 500 percent of the player's wager amount (the win amount used in the calculation can include any winnings from a bonus round).
Player Spin Losing Streak: A player has completed 5 consecutive spins without a single win.
High Wager Player: A player's wagers in a 10 minute window are all greater than or equal to a certain amount (e.g., 5 dollars or credits).
Player Winning Streak: A player wins 5 times in a row on any slot game in a single session.
Bad Player Experience: The player's average payout is less than the average wager amount spanning over 500 spins or 60 minutes.
Player Gaming Account Registration: A player has successfully registered an account.
Gamification/Player Achievement: For a given list of games in a defined time window, the player achieves one or more of the following: play X1 games; have X2 games where the wager amount was at least Y; win X3 number of games where symbol Z was either on a winning pay line or was visible; trigger free games X4 times; or trigger bonus feature X5 times.
Player Happiness Indicator (Good Experience): For a defined window (e.g., X1 minutes or X2 number of games), a "good experience" can be determined based on any of the following: actual hold with respect to theoretical hold above or below a specified threshold; a big win (greater than X1 credits won or a payout that is at least X2 times the wager amount); balance reaches a low threshold; or the percentage of games with a jingle (i.e., a payout that is at least X times the wager amount).
Identify Future Potential VIPs: This can be determined based on the percentage of wagers in a window of time or number of games in which the bet amount is greater than X percent of the maximum bet.

It is to be understood that these standing queries are examples only. Other standing queries are possible as well.

The core of the EPE platform is an EPE server where the standing queries are uploaded to. The engine stores the queries and runs the data through the queries. When conditions occur that match queries, the engine responds in real-time. The EPE server will bind the queries to the relevant event streams so that the queries will be actively processing events from the event streams. When the EPE platform receives a result from a standing query (i.e., the standing query's criteria are met), the EPE platform will then publish the result to a channel that will notify interested consumers of the event. A consumer can be any component that will receive results from the EPE server via a specific channel. The channel is the message channel that receives the result messages and provides them to consumers.

The standing queries included in the EPE platform could be pre-defined standing queries and could be used for multiple casinos/venues. In some implementations, the EPE platform could also include casino-defined standing queries that are designed by or for a specific casino or casinos.

The electronic game machine and EPE platform together can provide additional features beyond core gaming features, where these additional features enable the electronic game machine to better service the player. In some embodiments, an electronic game machine does not need to have extra hardware/software add-ons, such as card readers and separate display screens, to provide these additional features. By providing better service to the player, the player can play with the electronic game machine longer, increase player retention, and increase casino revenue.

II. Techniques Related to Player Journey Actions

FIG. 1 shows system 100 for event processing related to enhancing a player's experience at a gaming location, such as a casino. System 100 includes server computing device 112 located at data center 110. Server computing device 112 includes event collection and dispatch software 114, event processing software 116, and event database 118. In other examples, more than one server computing device 112 can store and execute data and software for event collection and dispatch software 114, event processing software 116, and event database 118. In other examples, multiple instantiations of event collection and dispatch software 114, event processing software 116, and/or event database 118 can be operating simultaneously by server computing device 112 (and perhaps other computing devices).

Data center 110 and computing device 112 can be communicatively coupled to gaming location 120, local computing device 122, and electronic gaming machines 126a, 126b via network 140. Gaming location 120 can be a location where one or more gaming machines such as electronic gaming machines 126a, 126b are available for play; e.g., a land-based casino, a cruise ship, a video poker room, etc.

Each of electronic gaming machines 126a, 126b can be configured to play one or more wager games, where a player can place a bet or wager on one or more outcomes of one or more gaming events and win one or more awards if the outcome(s) are successful (from the player's point of view) or lose the wager if the outcome(s) are unsuccessful (again, from the player's point of view). Example of wager games include, but are not limited to, slot machine games, poker, blackjack, baccarat, craps, roulette, and wheels of fortune.

Gaming machines that play wager games come in a variety of forms including, for example, a mechanical slot machine. A mechanical slot machine may include one or more reels, each of which includes multiple symbols distributed around the circumference of the reel. When a player places a wager (e.g., by placing a coin in the machine), the player is allowed to spin the reels. Each reel then comes to rest, typically with either one of the symbols, or a space in between symbols, in alignment with a pay line. A predefined winning symbol or a predefined winning combination of symbols that are aligned with the pay line can result in the player winning the game and receiving a payout. In one example, the machine may include three reels, and the pay line may be a horizontal line disposed across a center of each of the three reels.

In another example of a wager game, a mechanical slot machine may present symbols in a matrix arrangement, with each symbol changing during a spin of the game. For example, the machine may have five columns and three rows of symbols, for a total of fifteen symbols. Such machines often have multiple pay lines, each being defined by a collection of positions within the matrix. For example, the machine may have three pay lines, each corresponding to one row of the matrix. A mechanical slot machine can be configured with one or more computing devices and communication interfaces that enable it to operate as an electronic gaming machine.

Another example of a wager game can take the form of a video gaming machine (e.g., a dedicated gaming machine located in a casino) that includes a graphical user interface (GUI), and that may emulate a mechanical slot machine. With a video gaming machine, the GUI may include a display that displays an image of one or more reels or a matrix as described above, together with animation effects to simulate a spin of the one or more reels, or a spin of the columns or rows of the matrix. A computer software program, which may reside in the video gaming machine, may randomly select one or more symbols in response to a spin, and may display the selected one or more symbols on the display. A video gaming machine may also be played over a computer network; e.g. network 140, such as by a player using a client machine; e.g., electronic gaming machine 126a, 126b that is connected to a server machine; e.g., server computing device 112 over the computer network. In this instance, server computing device 112 may perform the spins of the game and may send the resulting symbols to electronic gaming machine 126a, 126b for display.

FIG. 1 shows that electronic gaming machines 126a, 126b can be connected to network 140 via local computing device 122. Local computing device 122 includes event cache 124 that includes memory and related software for collecting, storing, and dispatching events, such as gaming location events 132, 132a, 132b and player journey actions 134, 134a, 134b. In some embodiments not shown in FIG. 1, electronic gaming devices 126a, 126b can be directly connected to network 140 without connection to an intermediate computing device, such as local computing device 124. In other embodiments, gaming location 120 can include more, fewer, and/or different electronic gaming devices than 126a and 126b. In still other embodiments, more than one gaming location 120 and/or more than one data center 110 can be connected via network 140.

Network 140 may correspond to a local area network (LAN), a wide area network (WAN), a corporate intranet, the public Internet, or any other type of network configured to provide a communications path between networked computing devices. Network 140 may also correspond to a combination of one or more LANs, WANs, corporate intranets, and/or the public Internet. In still other embodiments, other computing devices can be connected to network 140. These other computing devices can be any sort of computing device, such as an ordinary laptop computer, desktop computer, wearable computing device, mobile computing device, head-mountable device (HMD), network terminal, wireless communication device (e.g., a smart phone or cell phone), and so on.

Event processing software 116 can be a high-performance system built to analyze and act on high volumes of real-time streaming data from multiple sources, by utilizing defined set of tools and techniques for analyzing and controlling a complex series of interrelated events that occur across multiple systems such as gaming servers and external systems. Event processing software 116 can carry out certain actions on simple or complex events (sometimes referred to as patterns that analyses and correlates information across multiple events) in real-time. The event processing software 116 may perform these functions using standing queries, as described above.

The external systems can include external promotions systems. For example, an external promotion system may send a text message to a player such as: "You have been chosen for promotion. Play 500 spins on game X in the next hour and earn 50 free spins." The external promotion system can push these player details into the EPE platform as a separate stream. A standing query can monitor this stream from the external promotion system along with the wager stream.

Event processing software 116 can enable creation of custom location-specific and/or electronic-gaming-machine specific triggers and queries of gaming location events 132 and other data to generate player journey actions 134. A trigger can involve conditional generation of one or more player journey actions 134; that is, if a trigger condition is met, one or more player journey actions 134 are generated.

Trigger conditions can include at least (a) game level trigger conditions and (b) behavioral trigger conditions.

Game level trigger conditions can include trigger conditions specific to outcomes and events within a wager game, while behavioral trigger conditions can include trigger conditions based on the actions and behaviors of the player. The game level trigger conditions can be related to one or more achievements that are based on various functions in a particular wager game. These achievements can include, but are not limited to, achieving a particular combination of symbols during slot machine play (e.g., getting a row full of a certain symbol), winning a predetermined number of plays of a wager game (e.g., 3, 5, 10) in a row, and playing one or more bonus rounds.

Examples of in-game events that can be triggered as achievements include, but are not limited to: playing a wager game for the first time, getting a predetermined number (e.g., 3, 5, 10) of consecutive winning outcomes (e.g., winning spins of a slot machine game), achieving a win that includes all pay lines of a slot machine game, playing a predetermined number (e.g., 2, 5, 7) of bonus rounds, playing two or more consecutive bonus rounds, playing bonus rounds after each of two or more consecutive plays of the wager game, getting a bonus win equal to or greater than predetermined number (e.g., 3, 4, 5, . . . ) times a total wager placed for the wager game, and achieve all possible win combinations of a wager game.

When a player has won one or more achievements, one or more player journey actions 134 can be generated that cause an electronic gaming machine (e.g., electronic gaming machine 126a or 126b) to generate and provide a pop-up or other graphical user interface (GUI) feature to display notification(s) of the achievement(s) and related award(s) to the player. Once the player has won a predetermined number of achievements (e.g., 1, 3, 5, 10, 25, 50), a player can redeem the obtained achievements for bonuses, loyalty points, and/or cash.

In some embodiments, a player can save any achievements related to a particular wager game that have been won to the tracking account or another account; e.g., a loyalty program card number account. Then, when a player logs in to the tracking account or the other account using an electronic gaming machine configured to play the particular wager game, the previous in-game achievements can be loaded into the just-logged-into electronic gaming machine from the tracking account or other account.

Behavioral triggers and behavioral trigger conditions can be used to create and target specific incentive programs for relatively-quick and/or per-gaming session achievable targets (e.g., wager a predetermined amount of money during a gaming session, such as $100) and for relatively-long duration targets that can span multiple sessions (e.g. complete predetermined number, such as 1000, spins of a slot machine game) to repeatedly draw a player to a particular wager game.

Other behavioral trigger conditions include spending a predetermined number of credits (e.g., 1, 5, 10) on each wager game provided by a multi-game electronic gaming machine that can play multiple wager games, spending a predetermined number of credits (e.g., 1, 5, 10) on one or more particular wager games provided by the multi-game electronic gaming machine, purchasing at least a predetermined number of credits and/or adding at least a predetermined amount of currency using one electronic gaming machine and/or tracking account (e.g., at least 50 credits, 100 credits, $10, $20, or $100), playing one or more particular wager games at least a predetermined number of times (e.g., play games X and Y at least Z times, where $Z \geq 1$).

Behavioral trigger conditions can be based on a balance of an electronic gaming machine account and/or a tracking machine account. For example, a behavioral trigger condition can be reached if the balance of the electronic gaming machine account and/or the tracking machine account is below a low balance threshold value is reached; e.g., a threshold value of $0 or 0 credits, a threshold value of a predetermined non-zero amount of money or credits, a threshold value of a predetermined non-zero percentage of total money or credits wagered during a gaming session.

If a low balance threshold trigger condition is met, event processing software 116 can generate one or more player journey actions 134 that incentivize the player to add more money or credits. For example, once a low balance threshold trigger condition is met, one or more player journey actions 134 can be generated to display encouraging messages to the player (e.g., generate player journey actions 134 related to providing a message "You're doing great—keep on playing!"), tie additional deposits of money or credits to an achievement (e.g., generate player journey actions 134 related to providing an achievement if $X is deposited or if X credits are purchased, where X>0), provide a discount and/or free spins (e.g., generate player journey actions 134 related to getting X credits for the price of Y credits, where X>Y>0, generate player journey actions 134 related to buying X1 credits and then getting Y1 free credits, where X1 and Y1 are both greater than zero), and/or generate player journey actions 134 that provide enrollment in a bonus game or tournament if more money or credits are deposited. Other player journey actions 134 can be generated once a low balance threshold trigger condition is met. For example, discounted credits (e.g., insert $10 and get $15 worth of credits) could be made available during certain times.

Another example of a behavioral trigger condition can be a bad (or negative) experience trigger condition For example, a bad experience trigger condition can be met if the player has a big loss; that is, the player loses at least a predetermined amount on one wager (e.g. $500, 500 credits, etc.). A bad experience trigger condition can be met if the player is on a losing streak; that is, the player has lost at least a predetermined amount during a gaming session (e.g. the player is down at least $50 during the gaming session or the player is down at least 100 credits during the gaming session) and/or has lost at least a predetermined number of consecutive wagers (e.g., the player has lost 5 times in a row).

Other examples of bad experience trigger conditions can involve a delay in a service provided by the casino (e.g., beverage service, out of service machine, failed ticket printing), an unexpected condition (e.g., a power outage, a fire alarm), and a delay in obtaining a particular electronic gaming machine and/or type of electronic gaming machine (e.g., all of the video poker machines are occupied, causing the player delay in obtaining a video poker machine). Other bad experience trigger conditions are possible as well.

If one or more bad experience trigger conditions are met, one or more player journey actions 134 can be generated to ameliorate the bad experience. These player journey actions can include player journey actions that are related to the player journey actions mentioned above in connection with low balance threshold trigger conditions. Additionally, player journey actions 134 generated to ameliorate the bad experience can include the following player journey actions: encouraging in-session messages (e.g., "Your luck is bound to improve", "Sorry about the delay in drink service—your server will be by shortly"), award bonuses and/or free games related to the bad experience (e.g., generate actions to provide the awards and display a message such as "You've had a bad run of luck—here's one spin on the house" or "Thanks for coming back after the fire alarm—have a bonus round or free game on us—your choice!"), recommend different games (e.g., generate actions to display a message such as "Your luck might improve if you switch to game XXXXX", where XXXXX is a different, perhaps lower-volatility game than a wager game currently being played), provide free tournament entries and/or comps (e.g., drinks, meals, etc.), and/or alert personnel, such as a casino host, working at gaming location 120.

Further examples of player journey actions to ameliorate a bad experience may be associated with or arise from a losing streak by the player (i.e., "a spin bad beat"). A spin bad beat may arise when a player experiences n consecutive losses, where n>0. In such a case the player journey action may include returning the player's average wager amount to the player to be utilized for future game play. Such a player journey action may arise several times during a playing session. Alternatively, the player may be refunded with 50% of the player's average wager amount after n−2 consecutive losses, with a further 25% of the player's average wager amount after n−1 consecutive losses, and with a further 25% of the player's average wager amount after n consecutive losses. Other examples are possible as well.

Behavior trigger conditions can also be reached if a player has a positive experience, such as a big win or winning streak. For example, a positive experience trigger condition can be met if the player has a big win; that is, the player wins at least a predetermined amount on one wager (e.g. $500, 500 credits, etc.). A positive experience trigger condition can be met if the player is on a winning streak; that is, the player has won at least a predetermined amount during a gaming session (e.g. the player is up at least $50 during the gaming session or the player is up at least 100 credits during the gaming session) and/or has won at least a predetermined number of consecutive wagers (e.g., the player has won 5 times in a row).

One or more player journey actions 134 can be generated related to the positive experience trigger condition including actions to: provide in-session messages to an electronic gaming machine associated with the positive experience trigger condition (e.g., "Wow—you won a lot on that bet! Congratulations!"), provide alerts to other electronic gaming machines (e.g., alerts such as "Today, we had someone win $8,934 playing the XXXX slot machine just like you—you could be our next big winner"), and/or actions to provide free games, credits, bonuses, tournament entries and/or comps to a player meeting the positive experience trigger condition.

In operation, a player can create a tracking account that is associated with server computing device 112. In some examples, a sign-up/sign-in procedure for the tracking account can be presented to a player by an electronic gaming machine; e.g., electronic gaming machine 126a, 126b. The sign-up/sign-in procedure can obtain player data usable for reporting gaming location events 132 and/or generating player journey actions 134, where the player data can include: a unique identifier and passphrase, a telephone number, and/or a loyalty program card number (e.g., a Total Rewards card number often used at Caesar's Entertainment locations, or an MLife card number often used at MGM Resorts International locations). In some embodiments, use of a loyalty program card number can be integrated with server computing device 112 to enable a loyalty program card holder to use the loyalty program card number account credentials to create a tracking account.

The sign-up/sign-in procedure can include a login procedure to access the tracking account. The login procedure can include presentation and verification of player identification information, such as, but not limited to, one or more of: a unique identifier and passphrase, a printed ticket, a telephone number, a loyalty program card number, biometric data entry (e.g., facial recognition of the player), a barcode and/or a quick response (QR) code, and/or presentation and verification via a registration application program interface (API) such as APIs that conform at least in part to a Game To System (G2S) and/or and a System To System (S2S) standard promulgated by the Gaming Standards Association.

Once a player has entered correct player identification information via the sign-up/sign-in procedure, a tracking account can be created and/or accessed on server computing device 112. When a player attempts to log into a tracking account via electronic gaming machine 126a, 126b, electronic gaming machine 126a, 126b can communicate with server computing device 112 to verify the correctness of player identification information. If the player identification information is determined to be correct, the player is allowed to login to the tracking account.

Also, once a player has logged in to a tracking account with correct identification information via electronic gaming machine 126a, 126b, server computing device 112 can record information associated with the tracking account, such as, but not limited to: information about gaming location 120, information about electronic gaming machine 126a, 126b used to log into the tracking account (e.g., machine account and/or socket identifier information) and timing information (e.g., Session Start Date/Time information). The recorded information can be used to determine one or more of the following: display messages, bonuses, free game and/or cash awards, and entry into incentive programs. Once the tracking account has been created and/or accessed, a successful account creation and/or login message can be presented to the player via electronic gaming machine 126a, 126b.

The tracking account can enable use of the player data on the electronic gaming machine and perhaps in other environments, such as in on-line gaming and/or mobile device gaming environments. Some or all of the player data can be presented via electronic gaming machine 126a, 126b upon successful login—the player data can include, but is not limited to, account information such as reward information, notifications/messages, and in-game achievement information.

The player can use electronic gaming machine 126a, 126b in a player session involving play of one or more wager games. Each wager and/or other event the player carries out can be recorded against the tracking account and can provide one or more gaming location events—for example, if the player is using electronic gaming machine 126a or 126b to play wager game(s), the player's events can be provided as respective gaming location events 132a or 132b.

Gaming location events 132a, 132b can include, but are not limited to, events and/or data related to.

The player; e.g., name, telephone number, loyalty card number

Gaming location 120; e.g., location name, physical location/address information, location operator The electronic gaming machine; e.g., physical location, machine operator, hardware and/or software information, uptime/downtime status, time since last wager Tracking account information Information about a wagering balance associated with an electronic gaming machine; e.g., the player has a balance of $50 to wager, the player has a balance of 137 credits/spins for wagering One or more banking accounts associated with the player and/or tracking account One or more wagers/bets made by the player One or more pay-outs made to the player A credit or monetary balance on the electronic gaming machine One or more bonuses awarded to the player Change in a menu of the electronic gaming machine Display of one or more screens, including one or more bonus screens, generated by the electronic gaming machine Selection of one or more buttons of the electronic gaming machine; e.g., a service button requesting help or refreshment at the electronic gaming machine, a cash-out button removing finances from the electronic gaming machine, a button changing screens and/or wager games provided by the electronic gaming machine Positions of symbols of the wager game as presented by the electronic gaming machine Insertion of cash, credit card, a printed ticket or other finances by the player into the electronic gaming machine (e.g., a "cash-in" event)

Removal of cash or other finances by the player (e.g., a "cash-out" event)

Printing a ticket for a cash-out event.

Gaming location events 132a, 132b can be stored in local cache 124 and provided as gaming location events 132 to server computing device 112. Some or all of gaming location events 132 can be stored in event database 118. In some embodiments, event database 118 can be used to store or all of player journey actions 134 as well. In still other embodiments, electronic gaming machine 126a (or 126b) can provide gaming location events 132a (or 132b) and receive player journey actions 134a (or 134b) from server computing device 112 via network 140 without use of local computing device 122.

Data stored in event database 118 can be made available to a reporting framework to generate reports. In some embodiments, part or all of the reporting framework can be software resident on and executable by server computing device 112. In other embodiments, part or all of the reporting framework can be software resident on and executable one or more computing devices other than server computing device 112. In particular of these other embodiments, the one or more computing devices other than server computing device 112 can be connected to server computing device by network 140.

The reporting framework can generate one or more reports that can include information about:

One or more pre-set configurations used when playing a wager game,

One or more buttons used when playing a wager game; e.g., buttons pressed on a dynamic button panel, One or more displays, screens, lobbies, and/or menus active on an electronic gaming machine when playing a wager game, and/or Wagers made during a wager game; e.g., information indicating whether the player made a maximum wager.

Other reports and information provided by reports are possible as well.

To generate the reports, electronic gaming machine 126a (or 126b) can provide gaming location events 132a (or 132b) to local computing device 122, which may store gaming location events 132a (or 132b) in event cache 124. Upon reception of gaming location events 132a (or 132b), local computing device 122 can aggregate, compress, and/or optimize events in an event stream that includes gaming location events 132a (or 132b)—the aggregation, compression, and/or optimization of events can be used to reduce an amount of bandwidth provided by network 140 that is utilized between gaming location 120 and data center 110. Then, local computing device 122 can provide the gaming location events as gaming location events 132 to event collection and dispatching software 114 of server computing device 122. Gaming location events 132 can be provided by event collection and dispatching software 114 to event database 118 for storage. In some embodiments, event database 118 can be associated with an event dispatcher that can forward some or all of gaming location events 132 to the reporting framework, which can then generate some or all of the reports mentioned immediately above.

Event collection and processing software 114 and/or event processing software 116 can organize gaming location events 132 into one or more event streams. These event streams can include, but are not limited, to wager streams, balance streams, and electronic gaming machine event streams. A wager stream can include, but is not limited, events and/or information related to one or more wagers, such as information about a gaming location where the wager(s) were made, information about a wagering player making the wager(s), one or more banking accounts associated with the wagering player, a base position (the precise physical location of the EGM on the casino floor), a pre-set ID (an identifier of the EGM's game configuration such as button panel and bet amounts), one or more wagering balances for an electronic gaming machine used to make the wager(s), a tracking account associated with the wagering player, one or more wagers made by the wagering player, any additional bet/wager information, and one or more pay-outs made to the wagering player.

A balance stream can include, but is not limited, events and/or information related to balances associated with a particular player; such as: information about a gaming location where the particular player is playing, information about the particular player, one or more banking accounts associated with the particular player, a base position, one or more wagering balances associated with the particular player, a tracking account associated with the particular player, one or more bonuses awarded to the particular player, cash-in events associated with the particular player, cash-out events associated with the particular player, and types of cash-ins/cash-outs (e.g., tickets, currency notes, etc.).

An electronic gaming machine event stream can include, but is not limited, events and/or information related to balances associated with a particular electronic gaming machine, such as: as: information about a gaming location where the particular electronic gaming machine is located, one or more banking accounts associated with the particular electronic gaming machine, a base position, one or more wagering balances associated with the particular electronic gaming machine, a tracking account associated with the particular electronic gaming machine, events related to selection of one or more buttons of the particular electronic gaming machine, network events related to the particular electronic gaming machine, tilt information, and analytical metrics associated with the particular electronic gaming machine. The tilt information and analytical metrics can be used to monitor the "health" of the EGM, for example, to identify connection errors, faulty game operation, bandwidth speed, etc.

Gaming location events can be processed to put a player into one or more "swim lanes." A swim lane for a player can be defined using one or more metrics/algorithms that determine the player's mood and value and therefore which "swim lane" the player should be placed in. For example, a newly registered player may be placed in Swim Lane 1. Players in Swim Lane 1 may qualify for a welcome bonus. Players returning for their second, third, or Nth visit may be placed in Swim Lane 2, Swim Lane 3, or Swim Lane N, respectively. Players that qualify as potential VIPs (e.g., based on a standing query) may be placed in a VIP Swim Lane. A non-returning player may be placed in a Non-Returning Swim Lane and may receive a communication with a bonus offering to encourage play. A player that has a bad experience may be placed in a Bad-Experience Swim Lane. A player that has experienced a winning streak may be placed in a Win-Streak Swim Lane. Other types of swim lanes are possible as well.

Some metrics used to determine a swim lane for a player are include, but are not limited to:

Recency (How recently did the player visit the casino)
Frequency (How often does the player visit the casino)
Monetary (How much does the player spend? What is a typical bet size for the player?)
Game favorability (What games does the player like or dislike playing?)
Player reactions (How does the player react to player journey actions?)

Once determined, a swim lane for a player can be used by event processing system 116 to determine what, if any, player journey actions are provided for the player and to evaluate a player's value to an operator of gaming location 120. Depending on a player's reaction to player journey actions, event processing system 116 can change a swim lane of a player.

The use of swim lanes can avoid manual crunching of large amounts of data to determine what happened to the player and what actions should be taken. In some embodiments, the algorithms for determining swim lanes and associated player journey actions can be implemented in an efficient manner so that there is minimal delay to the player before determining swim lanes and/or player journey algorithms.

Upon processing gaming location events 132, perhaps after being organized into event streams, event processing software 116 can generate one or more player journey actions 134. Once generated, event processing software 116 can send player journey actions 134 to event collection and dispatching software 114, which in turn can send player journey actions 134 via network 140 to local computing device 122 at gaming location 120. Local computing device 122 can determine which of player journey actions 134 are applicable to each of electronic gaming machines 126a, 126b and send the applicable player journey actions 134 as respective player journey actions 134a, 134b to respective electronic gaming machines 126a, 126b.

Player journey actions 134 can include, but are not limited to, actions instructing an electronic gaming machine to add bonus funds to a wagering balance and/or a tracking account, display a message on the electronic gaming machine, and add free spins and/or games to a wagering balance and/or a tracking account. In some embodiments, player journey actions 134 can include adding an event insight dispatch which allows event processing software 116 to provide one or more specific event streams, such as wager streams, to local computing device 112. Event processing software 116 can provide specific information related to a specific gaming location and/or player, in a specific wager stream; e.g., free spins to qualify for a slot-machine tournament, displays related to jackpots available by wagering on a particular electronic gaming machine, etc.

Player journey actions 134 can involve actions related to messages and/or other displays provided by electronic gaming machine 126a or 126b. These messages and displays can play an important roles in player communication and in providing a player journey experience Electronic gaming machines 126a, 126b can be configured to receive rich-media messaging (RMM) messages encoded using Hyper Text Markup Language (HTML), Alchemy, and/or other message-related formats. Upon reception of one or more RMM messages, electronic gaming machines 126a, 126b can process the received RMM message(s) to generate displays that include animations that overlay wager-game-oriented displays at pre-determined locations and times and/or in a player lobby displayed by a particular electronic gaming machine.

An RMM message can be based on a template that specifies a message's branding, style, size and layout. RMM messages may be game-agnostic; that is, they may be independent of a particular wager game. Some RMM messages can be displayed as overlays over game (or other) displays; e.g., an RMM message indicating that "only 10 more plays to receive a 1000 play achievement bonus" can be displayed over a final wager game display to encourage a player to continue a player session after play of a wager game has completed.

Other RMM messages can be displayed in a reduced size; that is, they can be shrunk or squeezed into available display space provided by electronic gaming machine 126a, 126b. For example, if electronic gaming machine 126a or 126b can provide a display having R rows and C columns of pixels that includes an RMM display region having R1<R rows and C1<C columns. Then, RMM messages can be squeezed or shrunk into the R1×C1 sized RMM display region. Other RMM messages can be enabled to be displayed in some, but not all, regions of a display. For example, RMM messages can be displayed so as not to cover up a region of a display that provides balance account information, or a region indicating how much money or credits were won as an outcome of a wager game. RMM messages can be limited in time as well. For example, RMM messages might not displayed during wager game play or during bonus games, or might be displayed only when a gaming control, such as a button, has not been utilized for at least a predetermined amount of time (e.g., 0.5 to 3 seconds).

RMM messages can be provided as part of player journey actions 134, 134a, 134b and/or can be stored on electronic gaming machine 126a, 126b. In some embodiments, RMM messages can be initially stored on local computing device 122 and provided to electronic gaming machines 126a, 126b as indicated by player journey actions 134, 134a, 134b. Once an RMM message is provided to electronic gaming machines 126a, 126b, each of electronic gaming machines 126a, 126b can cache the provided RMM message. In still other embodiments, local computing device 122 and/or electronic gaming machines 126a, 126b can pre-download one or more RMM messages before operation. For example, the RMM message(s) can be downloaded during a setup or booting operation of local computing device 122 and/or electronic gaming machines 126a, 126b and so be readily available to local computing device 122 and/or electronic gaming machines 126a, 126b when the setup/booting operation has completed.

RMM messages can be associated with tracking information. That is, an RMM message can be associated with a tracking status of the RMM message. Example statuses of an RMM message include: a "fired" status indicating the RMM message has been sent to local computing device 122 and/or electronic gaming machines 126a, 126b, a "received" status indicating the RMM message has been received at local computing device 122 and/or electronic gaming machines 126a, 126b, a "read" status indicating the RMM message has been examined by local computing device 122 and/or electronic gaming machines 126a, 126b, and a "displayed" status indicating the RMM message has been displayed by electronic gaming machines 126a, 126b or, in the context of local computing device 122, provided to an electronic gaming machine for display.

RMM messages can include several types of messages; such as, but not limited to, notification messages, progress messages, and completion messages. A notification message might notify a player of a new reward offering. A notification message can be sent to an electronic gaming machine upon player login to a tracking account based on player eligibility. Player eligibility can be defined based on (a) whether the tracking account qualifies for an incentive associated with the reward offering and/or (b) whether the reward offering is based on anonymous play. The reward offering can based on anonymous play when a player does not have a tracking account, and so an anonymous temporary tracking account has been created for player journey actions. A progress message can notify a player about their advancement toward an incentive award. And, a completion message can notify a player of their eligibility of the incentive award.

For example, suppose a new incentive award was available to a player who plays a new wager game 25 times during a player session. The player could learn about the incentive award via a notification RMM message upon login to a tracking account using electronic gaming machine 126a. Then, the player could play the new wager game 20 times using electronic gaming machine 126a. After the 20$^{th}$ play, event processing software 116 can generate and send a player journey action 134a to electronic gaming machine 126a (via network 140 and local computing device 112) instructing electronic gaming machine 126a to display a progress RMM message indicating "Only 5 more plays before you reach the 25 play bonus round". After the progress RMM message was displayed, the player could play the new wager game 5 more times, for a total of 25 times during the player session. After the 25$^{th}$ play, event processing software 116 can generate and send player journey actions 134a to electronic gaming machine 126a instructing electronic gaming machine 126a to display a completion RMM message indicating "You reached the 25 play bonus round!!" and to play a bonus game associated with the incentive award. Many other examples of RMM messages are possible as well.

Once the player has finished a player session of one or more wager games, the player can log out from the tracking account. If a player does not log out, the player can be logged out automatically; e.g., by a particular electronic gaming machine acting autonomously, by event processing software sending a player journey event to instruct the particular electronic gaming machine to log out of the tracking account. Electronic gaming machine 126a, 126b, can include a logout button for a player to press to log out and functionality to determine an autonomous log out. The autonomous log out functionality can include functionality for logging out a tracking account after a predetermined amount of inactivity (e.g., 5 minutes, 10 minutes, an hour), functionality for logging out a tracking account associated with a zero wagering balance and/or zero-balance functionality, and/or other autonomous log out functionality.

Once a tracking account is logged out, a successful logout message can be displayed on electronic gaming machine 126a, 126b that logged out of the tracking account. The successful logout message can be displayed and then removed after a certain period of time (e.g., 1 minute, 5 minutes, 30 seconds). In some embodiments, determining that a player has logged into to another electronic gaming machine can trigger the log-out function; e.g., if a player's tracking account is logged into electronic gaming machine EGM1 and then the player's tracking account is logged into another electronic gaming machine EGM2, the player's tracking account can be logged out of electronic gaming machine EGM1. In particular of these embodiments, the player can be allowed to log into N (N>1) electronic gaming machines before the log out function is triggered—in this fashion, the player can play up to N electronic gaming machines simultaneously and the tracking account can be used to track events of the up to N electronic gaming machines.

Player journey actions can be used to control electronic gaming machines that are not currently being used by a player. For example, an operator of gaming location 120 and/or electronic gaming machine 126a and/or 126b can use player journey actions 134 to configure a number of different aspects of electronic gaming machine 126a and/or 126b; e.g., aspects related to promotion and marketing. For example, the operator of gaming location 120 and/or electronic gaming machine 126a and/or 126b can configure event processing software 116 to generate player journey actions 134 that cause electronic gaming machine 126a and/or 126b to display RMM messages that include top screen promotional images, sounds, and/or videos. Also, the operator of gaming location 120 and/or electronic gaming machine 126a and/or 126b can configure event processing software 116 to generate player journey actions 134 that define when and how top screen promotional images, sounds, and/or videos and/or other media will be provided by electronic gaming machine 126a and/or 126b.

As another example, the operator of gaming location 120 and/or electronic gaming machine 126a and/or 126b can use player journey actions 134 to configure electronic gaming machines 126a and/or 126b to generate player journey actions related to an idle gaming machine incentive. The idle gaming incentive can be offered when gaming location events indicate that a particular electronic gaming machine has been idle; e.g., has not received a wager for at least a predetermined amount of time. For example, player journey actions related to an idle gaming machine incentive can include player journey actions to display an incentive screen to attract players to the idle electronic gaming machine and player journey actions to provide the idle gaming machine incentive to use the idle electronic gaming machine. The idle gaming machine incentive can be based on a pre-determined coin-in value or a minimum number of spins; e.g., generate player journey actions 134 for the idle electronic gaming device related to: getting X credits for the price of Y credits, where X>Y>0; buying X1 credits and then getting Y1 free credits, where X1 and Y1 are both greater than zero; playing one or more bonus games if X2 credits are purchased where X2>0; and/or providing instant or accelerated entry into a tournament if X3 credits are purchased where X3>0. Other incentives to use idle electronic gaming machines are possible as well.

Computing Device Architecture

Figure 2:
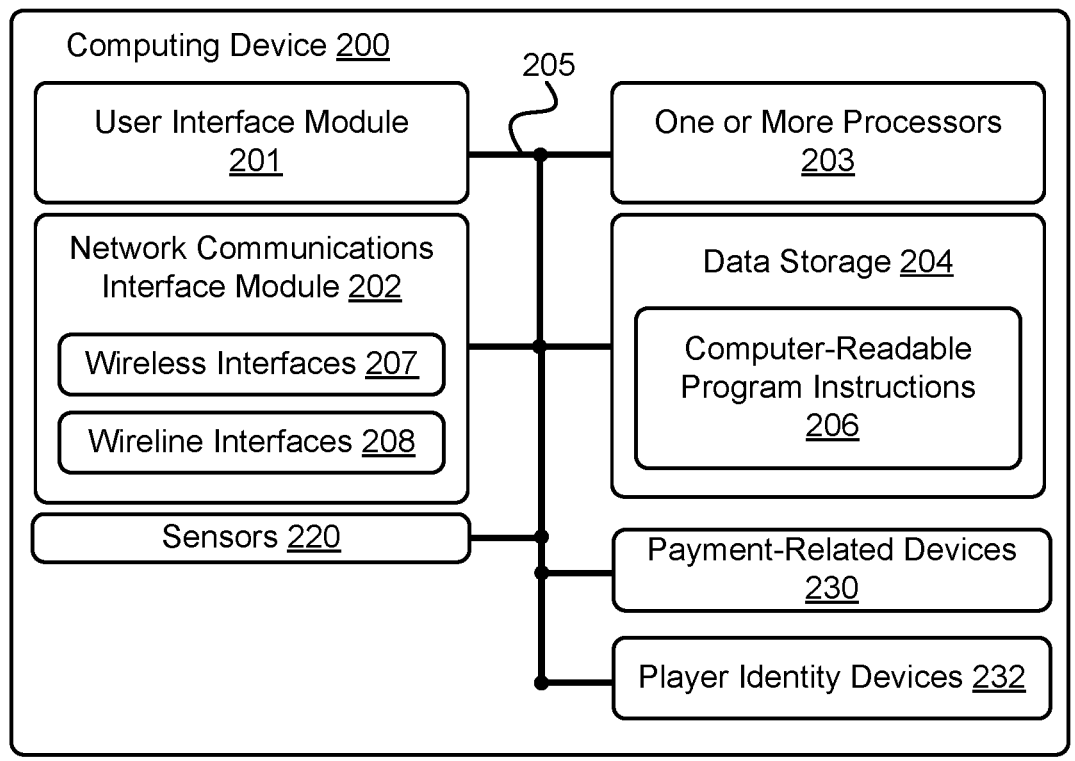
FIG. 2 is a block diagram of a computing device in accordance with an example embodiment.

FIG. 2 is a functional block diagram of computing device 200, in accordance with an example embodiment. In particular, computing device 200 shown in FIG. 2 can be configured to perform at least one function related to server computing device 112, event collection and dispatching software 114, event processing software 116, event database 118, local computing device 122, local cache 124, electronic gaming machine 126a, 126b, network 140, method 300, and/or method 400.

Computing device 200 may include a user interface module 201, a network-communication interface module 202, one or more processors 203, data storage 204, one or more sensors 220, one or more payment-related devices 230, and one or more player identity devices 232, all of which may be linked together via a system bus, network, or other connection mechanism 205.

User interface module 201 can be operable to send data to and/or receive data from external user input/output devices. For example, user interface module 201 can be configured to send and/or receive data to and/or from user input devices such as a keyboard, a keypad, a touch screen, a computer mouse, a track ball, a joystick, a camera, a voice recognition module, and/or other similar devices. User interface module 201 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 201 can also be configured to generate audible output(s), such as a speaker, speaker jack, audio output port, audio output device, earphones, and/or other similar devices.

Network-communications interface module 202 can include one or more wireless interfaces 207 and/or one or more wireline interfaces 208 that are configurable to communicate via a network. Wireless interfaces 207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 202 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 203 can include one or more general purpose processors, and/or one or more special purpose processors (e.g., digital signal processors, graphics processing units, application specific integrated circuits, etc.). One or more processors 203 can be configured to execute computer-readable program instructions 206 that are contained in data storage 204 and/or other instructions as described herein.

Data storage 204 can include one or more non-transitory computer-readable storage media that can be read and/or accessed by at least one of one or more processors 203. The one or more computer-readable storage media can include volatile and/or non-volatile storage components, such as optical, magnetic, organic or other memory or disc storage, which can be integrated in whole or in part with at least one of one or more processors 203. In some embodiments, data storage 204 can be implemented using a single physical device (e.g., one optical, magnetic, organic or other memory or disc storage unit), while in other embodiments, data storage 204 can be implemented using two or more physical devices.

Data storage 204 can include computer-readable program instructions 206 and perhaps additional data. In some embodiments, data storage 204 can additionally include storage sufficient to perform at least part of the herein-described methods, scenarios, and techniques and/or at least part of the functionality of the herein-described devices and networks.

In some embodiments, computing device 200 can include one or more sensors 220. Sensor(s) 220 can be configured to measure conditions in an environment of computing device 200 and provide data about that environment. For example, sensor(s) 220 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of computing device 200, such as, but not limited to, a gyroscope, an accelerometer, a Doppler sensor, a Global Positioning System (GPS) device, a sonar sensor, a radar device, a laser-displacement sensor, and a compass; and (iii) an environmental sensor to obtain data indicative of an environment of computing device 200, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor. Many other examples of sensor(s) 220 are possible as well.

In other embodiments, computing device 200 can include one or more payment-related devices 230. Payment-related devices 230 can be configured to obtain, accept, and/or dispense payments at computing device 200. Payments can take the form of coins, currency, printed payment tickets, credit cards, and/or electronic payments. Example payment-related devices 230 include, but are not limited to, one or more: bill acceptors, coin acceptors, bill dispensers, coin dispensers, payment ticket printers, payment ticket readers, credit card readers, and electronic payment processing hardware and/or software. Other examples of payment-related device(s) 230 are possible as well.

In still other embodiments, computing device 200 can include one or more player-identity devices 232. Player-identity devices 232 can be configured to obtain information that can identify a player. Player-identity devices 232 include, but are not limited to, one or more: input devices configured to accept at least player identifier, passphrase information, telephone numbers, that can identify a player; card and/or ticket readers configured to read one or more cards and/or tickets that have player identification data that identifies a player; cameras and/or barcode scanners configured to read barcode and/or a quick response (QR) code that have player identification data that identifies a player; biometric sensors configured to obtain facial and/or other biometric information that can identify a player; and/or software related to a G2S and/or S2S standard that can be used to identify a player. Other examples of player-identity device(s) 232 are possible as well.

III. Example Operation

Figure 3:
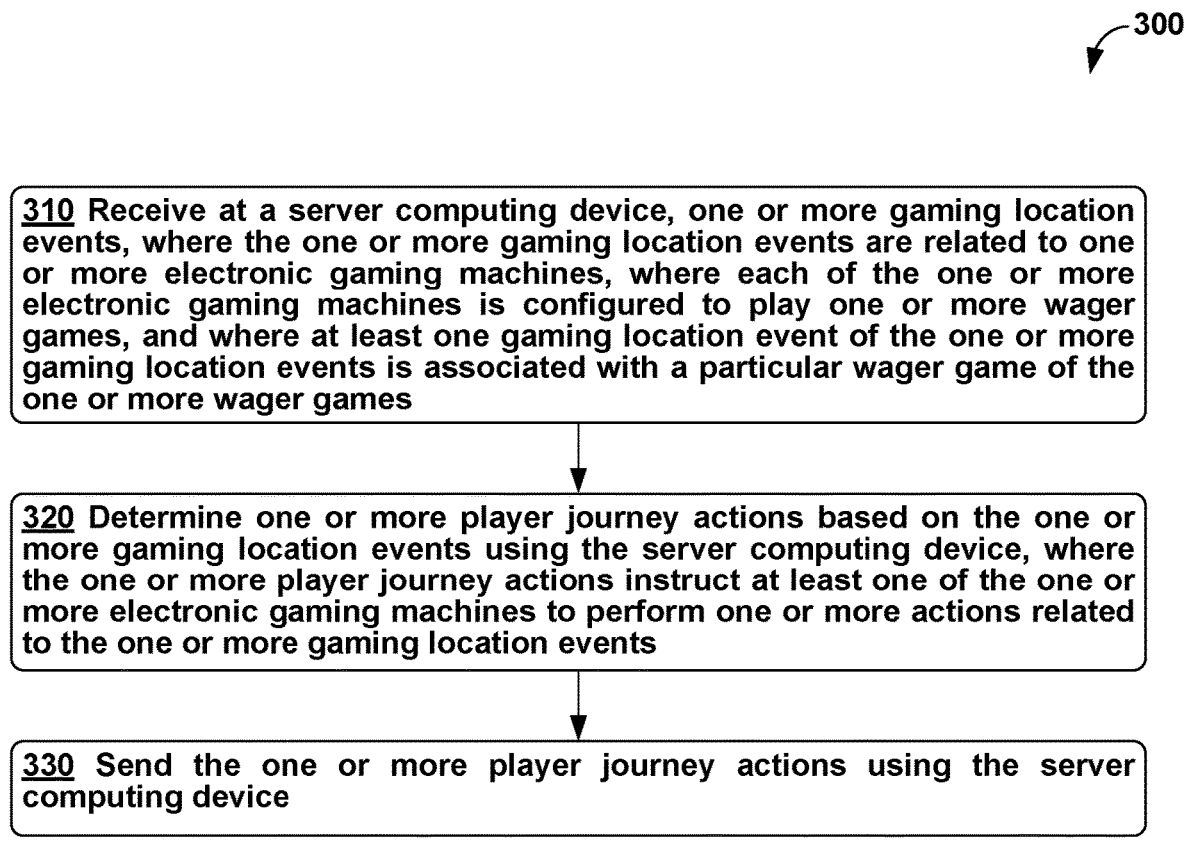
FIG. 3 is a flow chart of functions to carry out a method, in accordance with an example embodiment.

FIG. 3 is a flow chart depicting a set of functions 300 that can be carried out in accordance with an example embodiment. FIG. 3 shows set of functions 300 within blocks 310 to 330.

The set of functions 300 can be carried out by a computing device, such as computing device 200, configured as a server computing device. The server computing device can include one or more processors and data storage, such as discussed above at least in the context of computing device 200. The data storage can store computer-readable program instructions that, when executed by the processor(s) of the server computing device can cause the server computing device to perform functions. These functions include, but are not limited to, the set of functions 300 illustrated by FIG. 3.

FIG. 3 indicates that the set of functions 300 can begin at block 310. At block 310, the server computing device can receive one or more gaming location events, where the one or more gaming location events are related to one or more electronic gaming machines. Each of the one or more electronic gaming machines can be configured to play one or more wager games. At least one gaming location event of the one or more gaming location events is associated with a particular wager game of the one or more wager games, such as discussed above at least in the context of FIG. 1.

In some embodiments, the one or more gaming location events can include at least one of: an event related to a player of the particular wager game, an event related to a particular gaming location, an event related to a particular electronic gaming machine, an event related to a tracking account, an event related to a wager, an event related to a wagering balance, an event related to a pay-out, and an event related to a generated display, such as discussed above at least in the context of FIG. 1.

In some embodiments, the particular wager game can be at least one of: a slot machine game, poker, blackjack, baccarat, craps, and roulette, such as discussed above at least in the context of FIG. 1.

At block 320, the server computing device can determine one or more player journey actions based on the one or more gaming location events, where the one or more player journey actions can instruct at least one of the one or more electronic gaming machines to perform one or more actions related to the one or more gaming location events, such as discussed above at least in the context of FIG. 1.

In some embodiments, the one or more player journey actions can include: a player journey action that causes a particular electronic gaming machine of the one or more electronic gaming machines to display informational notifications, a player journey action that causes a particular electronic gaming machine of the one or more electronic gaming machines to show promotional materials, a player journey action that causes a particular electronic gaming machine of the one or more electronic gaming machines to provide one or more incentives, and a player journey action that causes a particular electronic gaming machine of the one or more electronic gaming machines to display promotional images, sounds, and/or videos, such as discussed above at least in the context of FIG. 1.

In other embodiments, determining the one or more player journey actions based on the one or more gaming location events can include: determining whether the one or more gaming events meets a trigger condition; and after determining that the one or more gaming events meets the trigger condition, determining one or more player journey actions associated with the trigger condition, such as discussed above at least in the context of FIG. 1. In particular of these embodiments, the trigger condition can be at least one of: a game level trigger condition related to an outcome within the particular wager game, and a behavioral trigger based on a behavior of a player of the particular wager game, such as discussed above at least in the context of FIG. 1.

In more particular of these embodiments, the trigger condition can include a game level trigger condition. Then, the one or more player journey actions associated with the game level trigger condition include a player journey action associated with displaying a notification of winning an achievement related to the particular wager game, and where the achievement related to the particular wager game includes at least one of: playing the particular wager game for a first time, getting a predetermined number of consecutive winning outcomes of the particular wager game, playing a predetermined number of bonus rounds of the particular wager game, and achieving a win that involves one or more pay lines associated with the particular wager game, such as discussed above at least in the context of FIG. 1.

In even more particular of these embodiments, the trigger condition can include a behavioral trigger condition. The behavioral trigger condition can include at least one of: a condition based on spending a predetermined number of credits on the particular wager game, a condition based on spending a predetermined number of credits on one or more particular wager games provided by a multi-game electronic gaming machine, a condition based on purchasing at least a predetermined number of credits using a particular electronic gaming machine, a condition based on playing one or more wager games at least a predetermined number of times, a low balance threshold trigger condition, a bad experience trigger condition, and a positive experience trigger condition, such as discussed above at least in the context of FIG. 1. In still more particular of these embodiments, the bad experience trigger condition can be based on at least one of: a determination that the player has lost more than a predetermined amount on one wager, a determination that the player has lost at least a predetermined amount during a gaming session, and a determination that the player has lost at least a predetermined number of consecutive wagers, such as discussed above at least in the context of FIG. 1. In yet more particular of these embodiments, the positive experience trigger condition is based on at least one of: a determination that the player has won more than a predetermined amount on one wager, a determination that the player has won at least a predetermined amount during a gaming session, and a determination that the player has won at least a predetermined number of consecutive wagers, such as discussed above at least in the context of FIG. 1.

In even other embodiments, determining the one or more player journey actions based on the one or more gaming location events can include: determining whether a first electronic gaming machine of the one or more electronic gaming machines has not received a wager for at least a predetermined amount of time based on the one or more gaming location events; and after determining that the first electronic gaming machine of the one or more electronic gaming machines has not received a wager for at least the predetermined amount of time, determining one or more player journey actions related to providing an idle gaming machine incentive for the first electronic gaming machine, such as discussed above at least in the context of FIG. 1.

At block 330, the server computing device can send the one or more player journey actions, such as discussed above at least in the context of FIG. 1.

FIG. 4 is a flow chart depicting a set of functions 400 that can be carried out in accordance with an example embodiment. FIG. 4 shows set of functions 400 within blocks 410 to 430.

The set of functions 400 can be carried out by a computing device, such as computing device 200, configured as an electronic gaming device. The electronic gaming device can include one or more processors and data storage, such as discussed above at least in the context of computing device 200. The data storage can store computer-readable program instructions that, when executed by the processor(s) of the electronic gaming device can cause the electronic gaming device to perform functions. These functions include, but are not limited to, the set of functions 400 illustrated by FIG. 4.

FIG. 4 indicates that set of functions 400 can begin at block 410. At block 410, the electronic gaming device can send one or more gaming location events. The electronic gaming machine can be configured to play one or more wager games. Thus, at least one gaming location event of the one or more gaming location events can be associated with a particular wager game of the one or more wager games, such as discussed above at least in the context of FIG. 1.

In some embodiments, the one or more gaming location events can include at least one of: an event related to a player of the particular wager game, an event related to a particular gaming location, an event related to a particular electronic gaming machine, an event related to a tracking account, an event related to a wager, an event related to a wagering balance, an event related to a pay-out, and an event related to a generated display, such as discussed above at least in the context of FIG. 1.

In some embodiments, the particular wager game can be at least one of: a slot machine game, poker, blackjack, baccarat, craps, and roulette, such as discussed above at least in the context of FIG. 1.

At block 420, the electronic gaming device can, after sending the one or more gaming location events, receive one or more player journey actions, where the one or more player journey actions instruct the electronic gaming machine to perform one or more actions that relate to the one or more gaming location events, such as discussed above at least in the context of FIG. 1.

In some embodiments, the one or more player journey actions can include: a player journey action that causes the electronic gaming machine to display informational notifications, a player journey action that causes the electronic gaming machine to show promotional materials, a player journey action that causes the electronic gaming machine to provide one or more incentives, and a player journey action that causes the electronic gaming machine to display promotional images, sounds, and/or videos, such as discussed above at least in the context of FIG. 1.

In other embodiments, the one or more gaming location events can include one or more gaming location events indicating that the electronic gaming machine has not received a wager for at least a predetermined amount of time based on the one or more gaming location events. Then, the one or more player journey actions include one or more player journey actions that cause the electronic gaming machine to provide an idle gaming machine incentive, such as discussed above at least in the context of FIG. 1.

At block 430, the one or more actions can be performed using the electronic gaming machine, such as discussed above at least in the context of FIG. 1.

IV. Additional Example Embodiments

The following clauses are offered as further description of the disclosure.

Clause 1—A method, including: receiving, at a server computing device, one or more gaming location events, where the one or more gaming location events are related to one or more electronic gaming machines, where each of the one or more electronic gaming machines is configured to play one or more wager games, and where at least one gaming location event of the one or more gaming location events is associated with a particular wager game of the one or more wager games; determining one or more player journey actions based on the one or more gaming location events using the server computing device, where the one or more player journey actions instruct at least one of the one or more electronic gaming machines to perform one or more actions related to the one or more gaming location events; and sending the one or more player journey actions using the server computing device.

Clause 2—The method of Clause 1, where the one or more gaming location events include at least one of: an event related to a player of the particular wager game, an event related to a particular gaming location, an event related to a particular electronic gaming machine, an event related to a tracking account, an event related to a wager, an event related to a wagering balance, an event related to a pay-out, and an event related to a generated display.

Clause 3—The method of either Clause 1 or Clause 2, where the particular wager game is at least one of: a slot machine game, poker, blackjack, baccarat, craps, and roulette.

Clause 4—The method of any one of Clauses 1-3, where the one or more player journey actions include: a player journey action that causes a particular electronic gaming machine of the one or more electronic gaming machines to display informational notifications, a player journey action that causes a particular electronic gaming machine of the one or more electronic gaming machines to show promotional materials, a player journey action that causes a particular electronic gaming machine of the one or more electronic gaming machines to provide one or more incentives, and a player journey action that causes a particular electronic gaming machine of the one or more electronic gaming machines to display promotional images, sounds, and/or videos.

Clause 5—The method of any one of Clauses 1-4, where determining the one or more player journey actions based on the one or more gaming location events includes: determining whether the one or more gaming location events meets a trigger condition; and after determining that the one or more gaming location events meets the trigger condition, determining one or more player journey actions associated with the trigger condition.

Clause 6—The method of Clause 5, where the trigger condition is at least one of a game level trigger condition related to an outcome within the particular wager game, or a behavioral trigger based on a behavior of a player of the particular wager game.

Clause 7—The method of Clause 6, where the trigger condition includes a game level trigger condition, where the one or more player journey actions associated with the game level trigger condition include a player journey action associated with displaying a notification of winning an achievement related to the particular wager game, and where the achievement related to the particular wager game includes at least one of: playing the particular wager game for a first time, getting a predetermined number of consecutive winning outcomes of the particular wager game, playing a predetermined number of bonus rounds of the particular wager game, and achieving a win that involves one or more pay lines associated with the particular wager game.

Clause 8—The method of either Clause 6 or Clause 7, where the trigger condition includes a behavioral trigger condition that includes at least one of: a condition based on spending a predetermined number of credits on the particular wager game, a condition based on spending a predetermined number of credits on one or more particular wager games provided by a multi-game electronic gaming machine, a condition based on purchasing at least a predetermined number of credits using a particular electronic gaming machine, a condition based on playing one or more wager games at least a predetermined number of times, a low balance threshold trigger condition, a bad experience trigger condition, and a positive experience trigger condition.

Clause 9—The method of Clause 8, where the bad experience trigger condition is based on at least one of: a determination that the player has lost more than a predetermined amount on one wager, a determination that the player has lost at least a predetermined amount during a gaming session, and a determination that the player has lost at least a predetermined number of consecutive wagers.

Clause 10—The method of either Clause 8 or Clause 9, where the positive experience trigger condition is based on at least one of: a determination that the player has won more than a predetermined amount on one wager, a determination that the player has won at least a predetermined amount during a gaming session, and a determination that the player has won at least a predetermined number of consecutive wagers.

Clause 11—The method of any one of Clauses 1-10, where determining the one or more player journey actions based on the one or more gaming location events includes: determining whether a first electronic gaming machine of the one or more electronic gaming machines has not received a wager for at least a predetermined amount of time based on the one or more gaming location events; and after determining that the first electronic gaming machine of the one or more electronic gaming machines has not received a wager for at least the predetermined amount of time, determining one or more player journey actions related to providing an idle gaming machine incentive for the first electronic gaming machine.

Clause 12—A server computing device, including: a processor; and a data storage device configured to store at least computer-readable program instructions that, when executed by the processor, cause the server computing device to carry out the method of one of Clauses 1-11.

Clause 13—A computer-readable medium configured to store instructions that, when executed by a processor of a server computing device, cause the server computing device to carry out the method of one of Clauses 1-11.

Clause 14—A server computing device, including: means for carrying out the method of one of Clauses 1-11.

Clause 15—A method, including: sending, from an electronic gaming machine, one or more gaming location events, where the electronic gaming machine is configured to play one or more wager games, and where at least one gaming location event of the one or more gaming location events is associated with a particular wager game of the one or more wager games; after sending the one or more gaming location events, receiving one or more player journey actions at the electronic gaming machine, where the one or more player journey actions instruct the electronic gaming machine to perform one or more actions that relate to the one or more gaming location events; and performing the one or more actions using the electronic gaming machine.

Clause 16—The method of Clause 15, where the one or more gaming location events include at least one of: an event related to a player of the particular wager game, an event related to a particular gaming location, an event related to a particular electronic gaming machine, an event related to a tracking account, an event related to a wager, an event related to a wagering balance, an event related to a pay-out, and an event related to a generated display.

Clause 17—The method of either Clause 15 or Clause 16, where the particular wager game is at least one of: a slot machine game, poker, blackjack, baccarat, craps, and roulette.

Clause 18—The method of any one of Clauses 15-17, where the one or more player journey actions include: a player journey action that causes the electronic gaming machine to display informational notifications, a player journey action that causes the electronic gaming machine to show promotional materials, a player journey action that causes the electronic gaming machine to provide one or more incentives, and a player journey action that causes the electronic gaming machine to display promotional images, sounds, and/or videos.

Clause 19—The method of any one of Clauses 15-18, where the one or more gaming location events include one or more gaming location events indicating that the electronic gaming machine has not received a wager for at least a predetermined amount of time based on the one or more gaming location events; and where the one or more player journey actions include one or more player journey actions that cause the electronic gaming machine to provide an idle gaming machine incentive.

Clause 20—An electronic gaming machine, including: a processor; and a data storage device configured to store at least computer-readable program instructions that, when executed by the processor, cause the electronic gaming machine to carry out the method of one of Clauses 15-19.

Clause 21—A computer-readable medium configured to store instructions that, when executed by a processor of an electronic gaming machine, cause the electronic gaming machine to carry out the method of one of Clauses 15-19.

Clause 22—An electronic gaming machine, including: means for carrying out the method of one of Clauses 15-19.

IV. Conclusion

Example embodiments have been described above. Those skilled in the art will understand that changes and modifications can be made to the described embodiments without departing from the true scope of the described embodiments as claimed.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the herein-described embodiments can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A method comprising:
receiving, at a server computing device, a plurality of gaming location events, wherein the plurality of gaming location events include first events related to wagers of a player in a first type of wager game provided by a client computing device and a second event related to the player and a second type of wager game provided by the client computing device, wherein the first type of wager game and the second type of wager game are different types of wager games;
determining, using the server computing device, that the first events meet a bad experience trigger condition, wherein the bad experience trigger condition is based on a determination that the player has lost at least a predetermined amount during a gaming session or a determination that the player has lost at least a predetermined number of consecutive wagers;
determining, using the server computing device before the player has switched to using the client computing device to play the second type of wager game, an instruction associated with the bad experience trigger condition and the second type of wager game;
determining, using the server computing device and based on the second event, that the player has switched to using the client computing device to play the second type of wager game; and
based on the determining that the first events meet the bad experience trigger condition and the determining that the player has switched to using the client computing device to play the second type of wager game, sending the instruction to the client computing device using the server computing device, wherein the instruction causes the client computing device to display a message, and wherein the message specifies an offer for the player to receive a number of free credits for use during the second type of wager game that the player is playing by subsequently adding one or more credits to the type of second wager game.

2. The method of claim 1, wherein the client computing device is configured as an electronic gaming machine.

3. The method of claim 1, wherein:
the first type of wager game is a first one of a slot machine game, a poker game, a blackjack game, a baccarat game, a craps game, or a roulette game, and
the second type of wager game is a second, different one of the slot machine game, the poker game, the blackjack game, the baccarat game, the craps game, or the roulette game.

4. The method of claim 1, wherein the instruction causes the client computing device to provide an award.

5. The method of claim 1, wherein determining that that the first events meet the bad experience trigger condition comprises executing a standing query on the plurality of gaming location events.

6. The method of claim 5, wherein executing the standing query comprises filtering the plurality of gaming location events based on a filtering condition so as to obtain the first events.

7. The method of claim 1, wherein the second event comprises a player login or a cash-in event.

8. The method of claim 1, wherein:
the first type of wager game includes a wager game having a first volatility, and
the second type of wager game includes a wager gaming a second volatility lower than the first volatility.

9. The method of claim 1, wherein the second event includes the client computing device being idle for not having received a wager for at least a predetermined amount of time.

10. The method of claim 1, wherein the number of free credits for use during the second type of wager game that the player is playing is for a single instance of playing the second type of wager game.

11. The method of claim 1, wherein the number of free credits for use during the second type of wager game that the player is playing is for multiple instances of playing the second type of wager game.

12. A server computing device, comprising:
a processor; and
a data storage configured to store at least computer-readable program instructions that, when executed by the processor, cause the server computing device to carry out functions comprising:
receiving a plurality of gaming location events, wherein the plurality of gaming location events include first events related to wagers of a player in a first type of wager game provided by a client computing device and a second event related to the player and a second type of wager game provided by the client computing device, wherein the first type of wager game and the second type of wager game are different types of wager games;
determining that the first events meet a bad experience trigger condition, wherein the bad experience trigger condition is based on a determination that the player has lost at least a predetermined amount during a gaming session or a determination that the player has lost at least a predetermined number of consecutive wagers;
determining, before the player has switched to using the client computing device to play the second type of wager game, an instruction associated with the bad experience trigger condition and the second type of wager game;
determining, based on the second event, that the player has switched to is-using the client computing device to play the second type of wager game; and
based on the determining that the first events meet the bad experience trigger condition and the determining that the player has switched to is-using the client computing device to play the second type of wager game, sending the instruction to the client computing device, wherein the instruction causes the client computing device to display a message, and wherein the message specifies an offer for the player to receive a number of free credits for use during the second type of wager game that the player is playing by subsequently adding one or more credits to the second type of wager game.

13. The server computing device of claim 12, wherein the client computing device is configured as an electronic gaming machine.

14. The server computing device of claim 12, wherein:
the first type of wager game is a first one of a slot machine game, a poker game, a blackjack game, a baccarat game, a craps game, or a roulette game, and
the second type of wager game is a second, different one of the slot machine game, the poker game, the blackjack game, the baccarat game, the craps game, or the roulette game.

15. The server computing device of claim 12, wherein the instruction causes the client computing device to provide an award.

16. The server computing device of claim 12, wherein determining that that the first events meet the bad experience trigger condition comprises executing a standing query on the plurality of gaming location events.

17. The server computing device of claim 16, wherein executing the standing query comprises filtering the plurality of gaming location events based on a filtering condition so as to obtain the first events.

18. The server computing device of claim 12, wherein the second event comprises a player login or a cash-in event.

19. A client computing device, comprising:
a processor; and
a data storage configured to store at least computer-readable program instructions that, when executed by the processor, cause the client computing device to carry out functions comprising:
sending a plurality of gaming location events to a server computing device, wherein the plurality of gaming location events include first events related to wagers of a player in a first type of wager game provided by the client computing device and a second event related to the player and a second type of wager game provided by the client computing device, wherein the first type of wager game and the second type of wager game are different types of wager games;
after sending the plurality of gaming location events, receiving an instruction determined before the player has switched to using the client computing device to play the second type of wager game, wherein the instruction instructs the client computing device to display a message based on the first events meeting a bad experience trigger condition and the second type of wager game, wherein the message specifies an offer for the player to receive a number of free credits for use during the second type of wager game that the player has switched to playing by subsequently adding one or more credits to the second type of wager game, and wherein the bad experience trigger condition is based on a determination that the player has lost at least a predetermined amount during a gaming session or a determination that the player has lost at least a predetermined number of consecutive wagers; and
displaying the message.

20. The client computing device of claim 19, wherein:
the first type of wager game is a first one of a slot machine game, a poker game, a blackjack game, a baccarat game, a craps game, or a roulette game, and
the second type of wager game is a second, different one of the slot machine game, the poker game, the blackjack game, the baccarat game, the craps game, or the roulette game.

* * * * *